(12) United States Patent
Thielman

(10) Patent No.: US 8,768,548 B2
(45) Date of Patent: *Jul. 1, 2014

(54) SPHERICAL INFRARED ROBOTIC VEHICLE

(75) Inventor: Gerhard W. Thielman, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 380 days.

This patent is subject to a terminal disclaimer.

(21) Appl. No.: 13/068,913

(22) Filed: May 4, 2011

(65) Prior Publication Data

US 2012/0316701 A1  Dec. 13, 2012

Related U.S. Application Data

(63) Continuation-in-part of application No. 12/386,179, filed on Apr. 10, 2009, now Pat. No. 7,963,350.

(51) Int. Cl.
| | |
|---|---|
| *B62D 55/00* | (2006.01) |
| *B62D 57/00* | (2006.01) |
| *G05D 1/00* | (2006.01) |
| *G05D 3/00* | (2006.01) |

(52) U.S. Cl.
USPC ............... 701/22; 701/41; 701/124; 701/514; 701/301

(58) Field of Classification Search
USPC ............ 701/1, 2, 22, 36, 37, 41, 48, 70, 124, 701/400, 408, 514, 519, 300, 301; 180/7.1
See application file for complete search history.

(56) References Cited

U.S. PATENT DOCUMENTS

| | | | |
|---|---|---|---|
| 1,915,886 A | 6/1933 | Gutierrez | |
| 2,107,766 A | 2/1938 | Rose | 180/10 |
| 2,267,254 A | 12/1941 | Reilley | 180/21 |
| 3,428,015 A | 2/1969 | Cloud | 441/78 |
| 3,905,323 A | 9/1975 | Kacere | 114/39.23 |
| 4,386,787 A | 6/1983 | Maplethorpe et al. | 280/206 |
| 4,729,446 A | 3/1988 | Sefton | 180/21 |
| 6,298,934 B1 | 10/2001 | Shteingold | 180/10 |
| 7,767,335 B2 | 8/2010 | Sharrow et al. | 429/156 |
| 7,963,350 B1 | 6/2011 | Thielman et al. | 180/7.1 |

*Primary Examiner* — Thomas Tarcza
*Assistant Examiner* — Edward Pipala
(74) *Attorney, Agent, or Firm* — Gerhard W. Thielman, Esq.

(57) ABSTRACT

A spherical infrared robotic vehicle (SIRV) is provided for remote reconnaissance. The SIRV includes a spherical shell, a chassis within the shell, an infrared sensor within the chassis and a set of wheels between the shell and chassis. The spherical shell has inner and outer surfaces. The chassis contains a platform, an electric motor and a power supply, and includes an infrared aperture. The infrared sensor mounts to the platform and is disposed to receive an infrared signal through the aperture as infrared images. The sensor can be a plurality of infrared cameras mounted in separate directions. The wheels are driven by the motor and supported by the chassis. The wheels engage the inner surface and turn in response to the motor. The shell rolls by turning the wheels to propel the SIRV.

17 Claims, 4 Drawing Sheets

SPHERICAL INFRARED ROBOTIC VEHICLE

CROSS REFERENCE TO RELATED APPLICATION

The invention is a Continuation-in-Part, claims priority to and incorporates by reference in its entirety U.S. patent application Ser. No. 12/386,179 filed Apr. 10, 2009 titled "Spherical Armored Mobile Platform" to B.-F. S. Thielman et al. and issued Jun. 21, 2011 as U.S. Pat. No. 7,963,350.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mobile reconnaissance platforms. In particular, this invention describes remotely or autonomously controlled spherical vehicles equipped with infrared sensors for local ground level missions.

Currently deployed robotic reconnaissance vehicles are designed to patrol areas in which hostile response to military presence may be suspected but difficult to identify by location, such as sniper attacks from high windows in an urban setting. Such vehicles may be constrained by considerations of speed (e.g., tracks), obstacle traversal (e.g., wheels) and/or maneuverability. In addition, the use of visual cameras may be of marginal utility for night-time or other conditions of low-visibility surveillance.

SUMMARY

Conventional unmanned reconnaissance platforms yield disadvantages addressed by various exemplary embodiments of the present invention. In particular, a self-propelled spherical infrared robotic vehicle (SIRV) is provided herein for remote reconnaissance. The SIRV includes a spherical shell, a carriage or chassis within the shell, an infrared sensor within the chassis and a set of wheels between the shell and chassis. The spherical shell has inner and outer surfaces and comprises a material substantially transparent to near infrared radiation.

The chassis contains a platform, an electric motor and a power supply, and has an infrared aperture. The infrared sensor mounts to the platform and disposed to receive an infrared signal through the aperture as infrared images. The sensor can be a plurality of infrared cameras mounted in separate directions. The set of wheels are driven by the motor and supported by the chassis. The wheels engage the inner surface and turn in response to the motor. Turning the wheels rolls the shell to propel the SIRV.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments of the spherical infrared robotic vehicle (SIRV) are described with reference to the drawings. The SIRV provides a cage chassis for mounting propulsion, power and sensor devices, and a spherical shell to enable self-propelled locomotion along a terrain. A plurality of infrared cameras aligned to view several directions represents a preferred embodiment of the SIRV.

Figure 1:
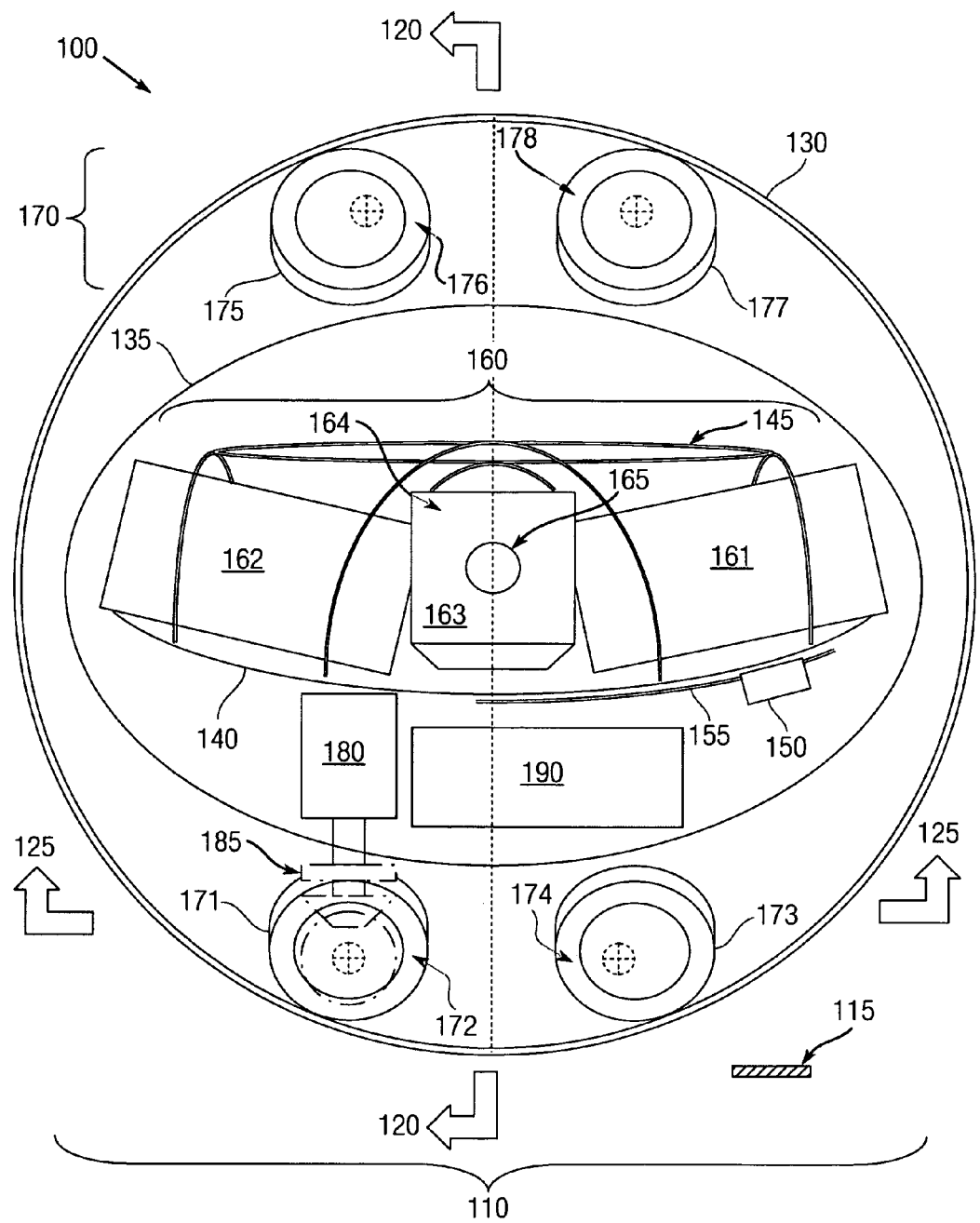
FIG. 1 is a starboard elevation view of a spherical reconnaissance vehicle.

FIG. 1 presents a starboard elevation view 100 of a SIRV 110 with scale-rule 115, aft section 120 and upper section 125. The scale-rule 115 denotes approximately one inch (~2.5 cm in length, such that the outer diameter of the SIRV 110 for the depicted configuration corresponds to about one foot (0.30 m). The SIRV 110 includes an outer spherical shell 130 and an inner chassis 135. An instrument support platform 140 includes a cage structure 145 for securing instruments mounted therein. Artisans of ordinary skill will recognize that the physical size shown is merely exemplary and that other dimensions can be selected for a mission-appropriate spherical vehicle without departing from the scope of the claims.

Optionally, an adjustable trim ballast 150 slides along a longitudinal rail 155 mounted on the platform 140 to shift center-of-gravity, such as when additional momentum may be necessary to traverse an obstacle, such as a depression in the road being traveled and/or to tilt the platform 140. The ballast 150 can also serve as a parking brake to balance the SIRV 110 in a neutral position during stowage.

The platform 140 supports a plurality of infrared sensors 160, such as infrared cameras for visual imaging of objects that emit or reflect electromagnetic radiation in the near infrared spectrum (wavelengths between 0.9 μm and 1.7 μm). For various exemplary embodiments, a quartet of four such cameras 160 can be arranged in a cruciform to point, and thereby capture images in four separate directions. The cameras 160 include a forward unit 161, an aft unit 162, a starboard unit 163 and a port unit 164 (obscured behind the starboard unit).

Each camera unit includes an aperture lens 165 for receiving infrared radiation. The chassis 135 can include apertures aligned with the lenses 165 to permit imaging. Alternatively, the chassis 135 can comprise material transparent at near infrared wavelengths, such that the chassis forms a substantially integral aperture that encompasses that structure. Artisans of ordinary skill will recognize that the four cameras 160 shown in cruciform pattern are merely exemplary as sensors and not limiting, either by number or by arrangement. The cage 145 secures the cameras 160 from lateral displacement while offering views unobstructed by the cage's structural elements.

The near infrared (NIR) thermal infrared imager by Infrared Cameras Incorporated (ICI) of Beaumont, Tex. 77705 represents an exemplary camera 160 for purposes of an infrared imaging sensor in the SIRV 110. The NIR imager incorporates an indium gallium arsenide (InGaAs) detector with a 320×256 array format at a 30 Hz frame rate in snapshot mode. The NIR imager has a spectral response between 0.9 µm and 1.7 µm and uses power input of $6V_{DC}$ supplied by a 2.00 mm jack. Each NIR imager has length, width and height of 3.7"× 2.5"×2.1" (94 mm×63.5 mm×53.3 mm) and a mass of 12.4 oz (350 g) without the lens.

The NIR imager employs RS232 protocol for communication and uses passive convection cooling. The NIR imager operates with typical power dissipation of 3 W, and is resistant to laser blinding. With the quartet of cameras 160 mounted in cruciform pattern on the platform 140 with views substantially perpendicular to each other and facing slightly upward (e.g., zenith of about 5° to 10°, extends about 10 inches (0.25 m). Thus, the SIRV could be contained within the one-foot diameter ball for the exterior shell 130. Artisans of ordinary skill will recognize that alternative infrared sensors or other imagers can be substituted for the cameras 160 without departing from the scope of the invention.

A set of eight wheels 170 separate the chassis 135 from the shell 130. The wheels 170 rotate on axles mounted to the chassis 135 both above and below the platform 140. On the lower portion of the chassis 135, wheels include: aft starboard 171, aft port 172, forward starboard 173 and forward port 174 that roll along the bottom interior surface of the shell 130. The shell 130 travels along a ground surface, such as a road, by rolling along as the wheels 170 propel the SIRV 110 forward (or rearward).

On the upper portion of the chassis 135, wheels include: aft starboard 175, aft port 176, forward starboard 177 and forward port 178 that roll along the top interior surface of the shell 130. The lower forward wheels 173, 174 and upper aft wheels 175, 176 can be steered. Each wheel 170 can be equipped with a rubber tire for traction along the interior surface of the shell 130. As illustrated, the wheels 170 each have a diameter of about two inches (5.1 cm). Turning the wheels 170 on the shell's interior surface causes the shell 130 to roll along the ground in the direction of travel.

In various exemplary embodiments, the chassis 135 further includes an electric motor 180 equipped with a clutch 185 that switchably turns a drive transmission, and a power package 190 that contains an electrical power source and a motor controller. Electrical power can be supplied by internally packaged chemical batteries, including commercially available types connected in series.

An exemplary type of battery that could be suitable would be the 2200-series Nickel-Cadmium (NiCad) cells provided by SR Batteries Inc. at Box 287, Bellport, N.Y. 11713. Each cell has a 0.9 inch (23 mm) diameter and 1.69 inch (43 mm) length weighing 2.1 oz (60 g) producing 1.25 $V_{DC}$ at 2.2 amphours and with 5Ω impedance. Six such NiCad cells can be arranged as three abreast at one diameter high and two across to produce 7.5 $V_{DC}$ (with voltage regulation to the NIR imager supply requirements).

Figure 2:
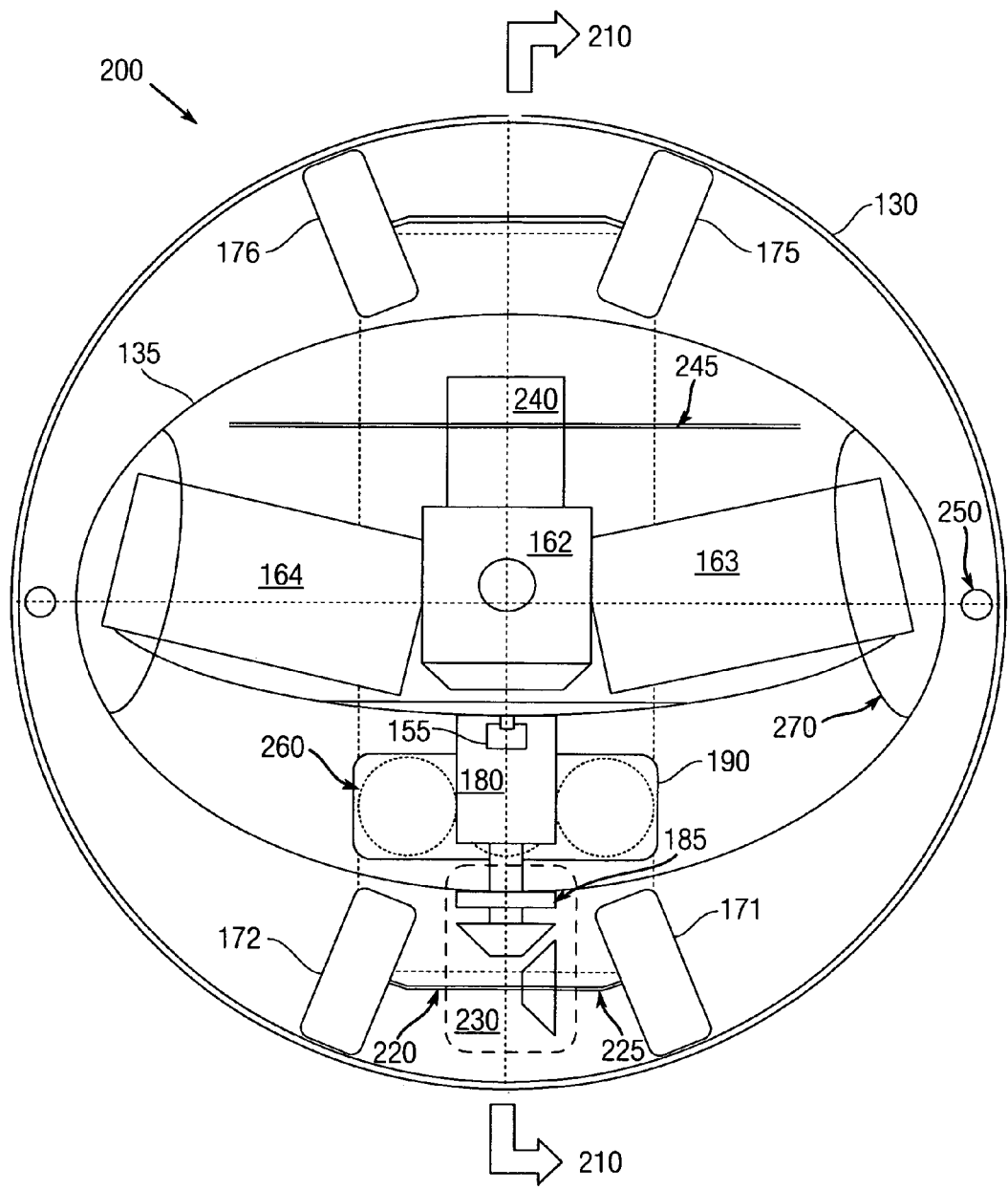
FIG. 2 is an aft elevation view of the reconnaissance vehicle.

FIG. 2 presents an aft elevation view 200 with starboard section 210. The view 200 represents the direction indicated by section 120, showing the lower aft wheels port 171 and starboard 172 and the upper aft wheels port 175 and starboard 176. A drive shaft 220 provides a lateral turning axis for the lower aft wheels to rotate, which couple to the shaft 220 by universal joints 225. A transmission 230 features gearing mechanisms that engage the shaft 220. The clutch 185 couples the transmission 230 couples to the motor 180.

A communication-and-control unit 240 with antenna 245 may be disposed within the space between the cameras 160. Alternatively, the unit 240 may be suspended from the ceiling of the chassis 135, or other arrangement based on design selection. The unit 240 includes a controller for the motor 180 and/or the clutch 185, as well as for the steering system. The unit 240 may also control disposition of the ballast 150.

The unit 240 also includes either a transceiver for receiving instructions from an operator and transmitting image signals for reconnaissance, or else a recorder to store such images for subsequent retrieval. An operator can optionally control the SIRV 110 by issuing radio commands to the unit 240 via a remote control device, such as used for model aircraft. Alternatively, the unit 240 can be equipped with an internal processor to enable autonomous locomotion and/or a global positioning system (GPS) receiver for navigating to a preselected destination.

Guide rollers 250 shown on port and starboard sides can be secured to the chassis 135 as a buffer to the shell 130 from lateral translation from traveling on uneven surfaces. The power package 190 may include NiCad batteries 260, although other forms of electrical power storage may alternatively be incorporated for the SIRV 110. The chassis 135 can include apertures 270 that provide a portal for the lenses 165 through which to view external infrared images. The apertures 270 can constitute vacant openings or else a transparent cover.

Figure 3:
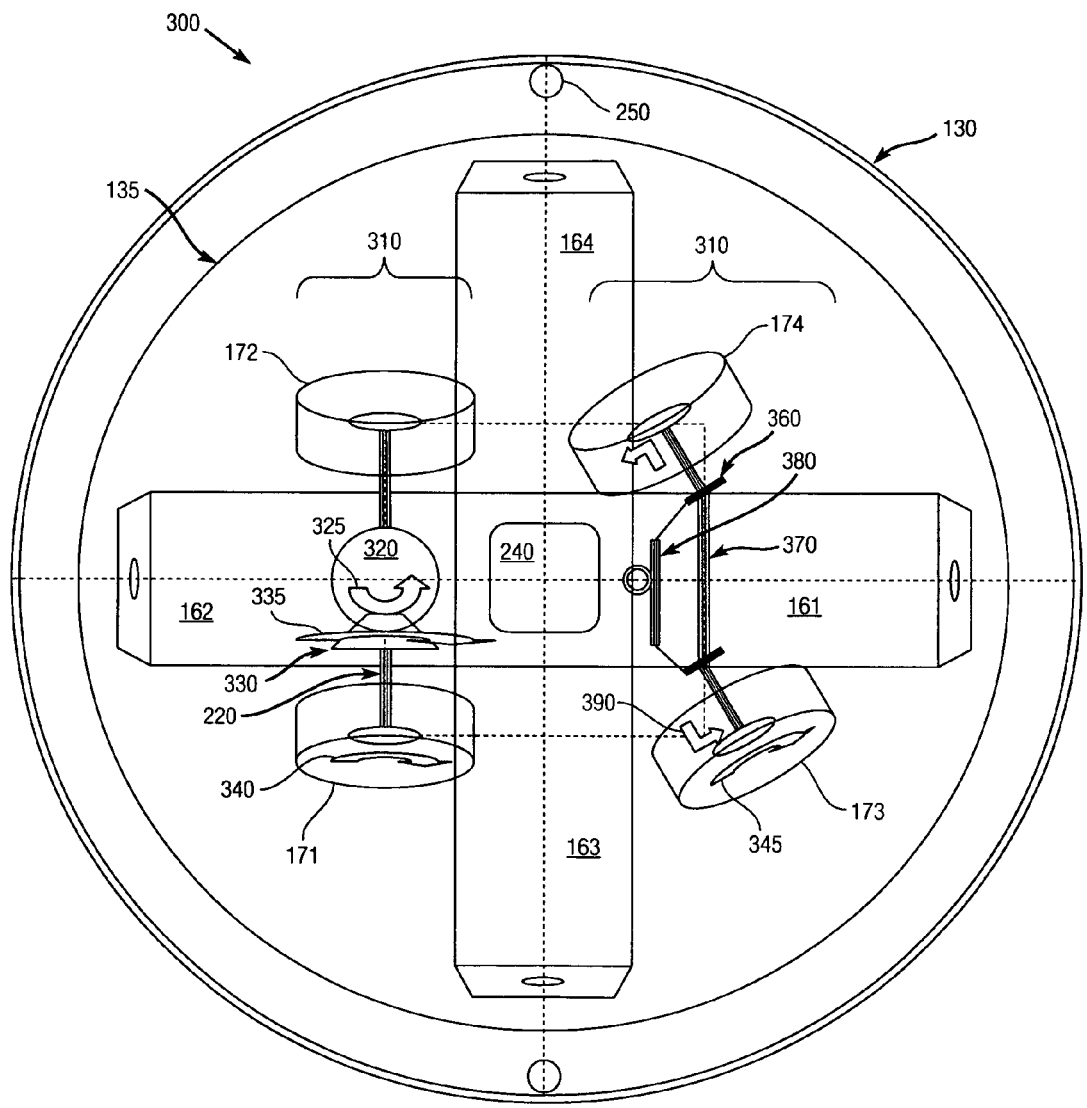
FIG. 3 is a plan view of the reconnaissance vehicle.

FIG. 3 presents a plan view 300 of the SIRV 100. The cruciform arrangement of the cameras 160 includes the forward 161, aft 162, starboard 163 and port 164 units, with the communication-and-control unit 240 disposed therebetween. The wheels 170 under the chassis 135 include the aft lower set 310 with starboard and port wheels 171, 172 connected to the drive shaft 220.

The transmission 230 includes a vertical bevel gear 320 rotated counterclockwise as denoted by arrow 325 by the motor 180 and a transverse bevel gear 330 rotated clockwise as denoted by arrow 335. The bevel gear 330 connects to the drive shaft 220 to rotate the lower aft set 310 so that the lower starboard wheels 171, 173 rotate in counterclockwise direction respectively denoted by arrows 340, 345.

The wheels 170 under the chassis 135 also include the lower forward set 350 with starboard and port wheels 173, 174 connected at pivot joints 360 to a steering axis 370. A steering system 380 pivots the joints 360 to angularly shift the forward set 350. The steering system 380 can constitute a rack-and-pinion arrangement or alternatively a scotch yoke to convert circular motion from a rotating motor into linear motion to turn the joints 360.

A complimentary upper aft set of wheels 170 above the chassis 135 also pivotably shifts contemporaneously with the lower forward set 350 so that the SIRV 110 turns to port upon command from the unit 230. The frame support for the wheels 170 that connect to the chassis 135 may include tensile springs. This suspension system provides substantially uniform compression by the wheels 170 against the interior surface of the shell 130.

Figure 4:
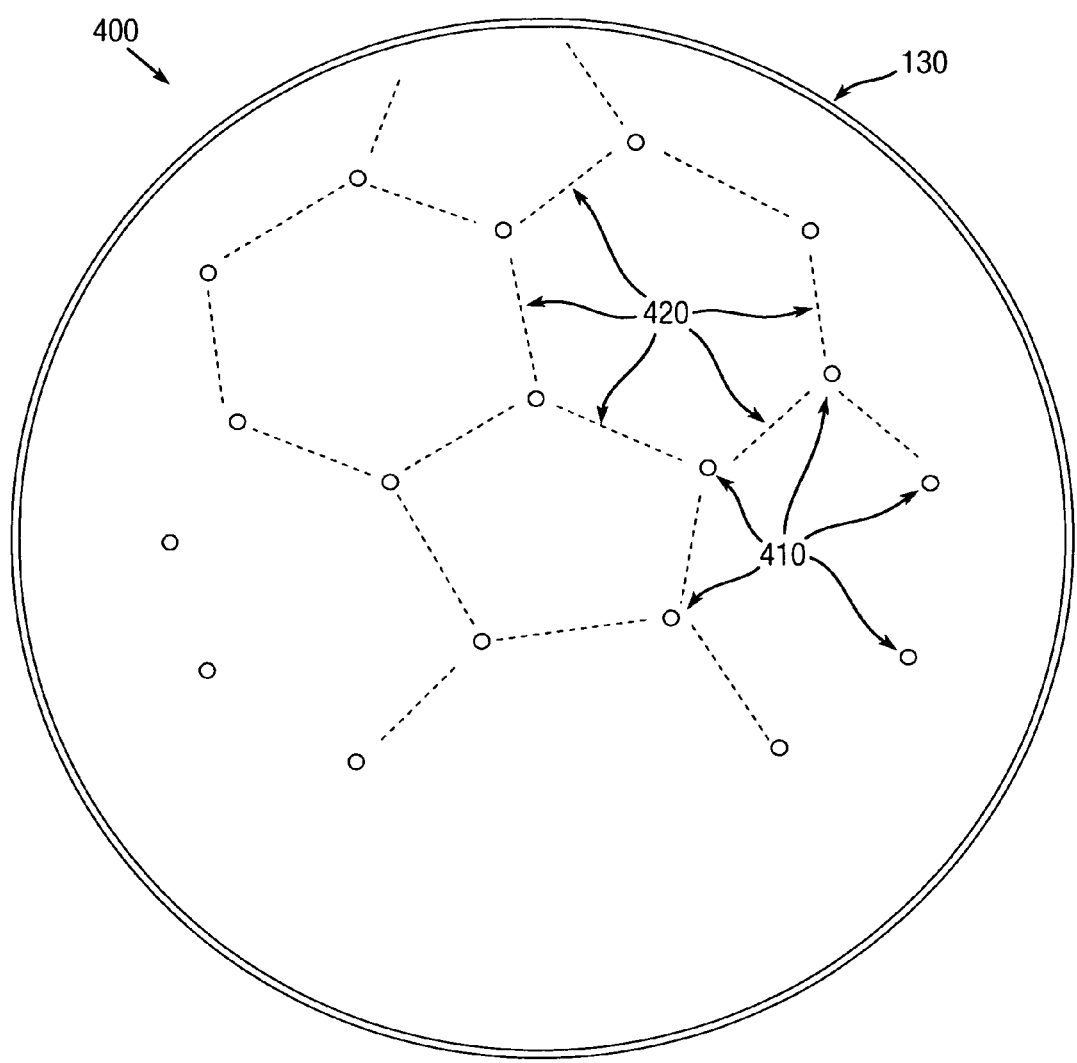
FIG. 4 is a secondary elevation view of the reconnaissance vehicle.

FIG. 4 presents another elevation view 400 showing the outside of the SIRV 110. An optional set of compressibly elastic buttons 410 are arranged along the exterior surface of the shell 130. In various exemplary embodiments, an arrangement based on Buckminster fullerene geometry can serve to dispose the positions of the buttons 410, as indicated by lines 420 that denote the outlined hexagonal and pentagonal shapes.

The chassis 135 can be composed of lightweight material with sufficient structural strength to support an estimated twenty pounds mass, including cameras 160 and attached wheels 170. Apertures 270 aligned with the cruciform axes can be incorporated to avoid blocking infrared radiation to the camera lenses 165. Alternatively, the chassis 135 can be composed of material substantially transparent in the near infrared spectrum to encompass an integral aperture for the cameras 160. The shell 130 can be composed of an appropriate material substantially transparent in the near infrared spectrum, such as alumina. With an estimated shell mass of about thirteen pounds, the one-foot diameter SIRV 110 for the configuration shown can be estimated to have a total mass of about thirty-five or forty pounds (16-18 kg).

Such infrared transparent materials include, but are not limited to, aluminum oxide ($Al_2O_3$, including the alpha-crystalline state called sapphire), magnesium fluoride ($MgF_2$), calcium fluoride ($CaF_2$), barium fluoride ($BaF_2$) and possibly silicon (Si). Optionally, a coating produced by diamond vapor deposition can be disposed on the exterior surface to reduce surface wear on the shell 130.

In particular, alumina (aluminum oxide) at 5 mm thickness (0.2 inch) has transparencies at least sixty-percent for wavelengths exceeding $\lambda > 1.3$ μm and about eight-percent for wavelengths around $\lambda > 2.3$ μm. Alumina has an index of refraction of about n≈1.8 and a density of about 250 $lb/ft^3$ (4 $g/cm^3$). An alumina shell with a thickness of 0.2 inch has a mass of about 13 pounds (5.8 kg).

Although the thickness of the shell material and spherical lens focus distortion may degrade optical quality from ideal imagery, field intelligence can sometimes benefit from even marginal reconnaissance resolution in regions of operationally difficult or problematic access. Moreover, infrared cameras 160, typically intended to detect small temperature differentiation, can be sufficient for determining presence of endothermic creatures or other indications of interest even with degraded optical conditions.

The SIRV 110 can thereby aid in the collection of visual field intelligence, such as within an urban area, especially under low visibility conditions with considerable agility. Due to its high relative speed and maneuverability compared to other robotic platforms, the SIRV 110 can accomplish such local ground-level reconnaissance missions, preferably without detection, but minimally without exposing military personnel to hostile attack.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A spherical infrared robotic vehicle (SIRV) for reconnaissance locomotion, said SIRV comprising:
   a spherical shell having inner and outer surfaces and comprises a material substantially transparent at infrared wavelengths;
   a chassis containing a platform, an electric motor, and a power supply, said chassis having an infrared aperture;
   an infrared sensor mounted to said platform, said sensor disposed to receive an infrared signal through said aperture as infrared images; and
   a set of wheels driven by said motor and supported by said chassis, wherein said wheels engage said inner surface and turn in response to said motor.

2. The SIRV according to claim 1, further comprising:
   a communication-and-control unit for providing drive commands to said motor, and for receiving said infrared images.

3. The SIRV according to claim 2, wherein said unit includes at least one of a radio control receiver, a global positioning receiver, a communications transmitter, and a signal recorder.

4. The SIRV according to claim 1, wherein said shell comprises one of aluminum oxide (alumina), magnesium fluoride, calcium fluoride, barium fluoride and silicon.

5. The SIRV according to claim 4, wherein said shell comprises alumina.

6. The SIRV according to claim 1, wherein said shell includes compressively elastic buttons disposed around said outer surface.

7. The SIRV according to claim 1, wherein said chassis comprises a material substantially transparent at near infrared wavelengths, thereby encompassing said aperture.

8. The SIRV according to claim 1, wherein said infrared sensor comprises a plurality of near infrared cameras mounted in separate directions.

9. The SIRV according to claim 1, further comprising:
   a translatable trim ballast for shifting center of mass.

10. The SIRV according to claim 1, wherein said power supply includes a plurality of NiCad batteries connected in series.

11. The SIRV according to claim 1, further comprising:
    a steering system for controllably turning said shell, wherein
    said set of wheels further include aft lower wheels, fore lower wheels, aft upper wheels and fore upper wheels,
    said steering system engages said fore lower wheels and said aft upper wheels.

12. The SIRV according to claim 11, wherein said motor engages said aft lower wheels.

13. The SIRV according to claim 11, wherein
    said aft lower wheels further include port and starboard aft lower wheels,
    said fore lower wheels further include port and starboard fore lower wheels,
    said aft upper wheels further include port and starboard aft upper wheels, and
    said fore upper wheels further include port and starboard fore upper wheels.

14. The SIRV according to claim 11, further comprising:
    a communication-and-control unit for providing drive commands to said motor and steer commands to said steering system, and for receiving said infrared images.

15. The SIRV according to claim 14, wherein said unit includes at least one of a radio control receiver, a global positioning receiver, a communications transmitter, and a signal recorder.

16. The SIRV according to claim 11, wherein said steering system includes a rack-and-pinion device for turning said forward lower wheels and said aft upper wheels.

17. The SIRV according to claim 11, wherein said steering system includes a scotch yoke device for turning said forward lower wheels and said aft upper wheels.

* * * * *